United States Patent
Li et al.

(10) Patent No.: US 10,693,347 B2
(45) Date of Patent: Jun. 23, 2020

(54) MOTOR DEVICE AND HEAT DISSIPATION DEVICE

(71) Applicant: CHICONY POWER TECHNOLOGY CO., LTD., New Taipei (TW)

(72) Inventors: Zong-Lin Li, New Taipei (TW); Wang-Hsuang Huang, New Taipei (TW); Chen-Shi Chou, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 86 days.

(21) Appl. No.: 16/102,995

(22) Filed: Aug. 14, 2018

(65) Prior Publication Data

US 2019/0393757 A1    Dec. 26, 2019

(30) Foreign Application Priority Data

Jun. 22, 2018  (TW) .............................. 107121566 A

(51) Int. Cl.
| | |
|---|---|
| *H02K 9/06* | (2006.01) |
| *H02K 5/18* | (2006.01) |
| *H02K 5/22* | (2006.01) |
| *H02K 9/22* | (2006.01) |

(Continued)

(52) U.S. Cl.
CPC ................ *H02K 9/06* (2013.01); *H02K 5/00* (2013.01); *H02K 9/22* (2013.01); *H02K 11/0094* (2013.01)

(58) Field of Classification Search
CPC .. H02K 5/00; H02K 5/18; H02K 5/22; H02K 9/06; H02K 9/22; H02K 11/00; H02K 11/0094
See application file for complete search history.

(56) References Cited

U.S. PATENT DOCUMENTS

| | | | | |
|---|---|---|---|---|
| 2,494,200 A | * | 1/1950 | Ramqvist ................. | H02K 9/06 310/52 |
| 2,834,897 A | * | 5/1958 | Fox ......................... | H02K 9/06 310/59 |

(Continued)

FOREIGN PATENT DOCUMENTS

| | | |
|---|---|---|
| CN | 202499961 U | 10/2012 |
| CN | 103683685 | 3/2014 |

(Continued)

*Primary Examiner* — Burton S Mullins
(74) *Attorney, Agent, or Firm* — Muncy, Geissler, Olds & Lowe, P.C.

(57) ABSTRACT

A motor device includes a motor, a motor driver housing, a motor control circuit board, a heat dissipation device, a heat isolation element and at least one fixing element. The motor includes fins arranged at a lateral portion of the motor. The motor driver housing includes a bottom surface. A gap is provided between the bottom surface and the lateral portion. The heat dissipation device is disposed at an end portion of the motor. The heat dissipation device includes a heat dissipation housing and a single fan. The heat dissipation housing includes an inlet and a first outlet. The first outlet faces the gap. The fan is disposed in the heat dissipation housing. The heat isolation element is connected to the motor and the heat dissipation housing. The fixing element passes through the heat isolation element and fixes the heat dissipation housing to the end portion of the motor.

17 Claims, 10 Drawing Sheets

(51) Int. Cl.
*H02K 11/00* (2016.01)
*H02K 5/00* (2006.01)

(56) References Cited

U.S. PATENT DOCUMENTS

| | | | | |
|---|---|---|---|---|
| 5,051,636 | A * | 9/1991 | Ishimoto | H02K 5/24 |
| | | | | 310/51 |
| 5,331,239 | A * | 7/1994 | Kwun | H02K 17/30 |
| | | | | 310/68 R |
| 6,177,740 | B1 | 1/2001 | Burns | |
| 6,229,232 | B1 * | 5/2001 | Roth-Stielow | H02K 5/225 |
| | | | | 310/160 |
| 6,461,092 | B2 * | 10/2002 | Tseng | F16B 13/128 |
| | | | | 411/178 |
| 6,989,616 | B2 * | 1/2006 | Okubo | H02K 11/01 |
| | | | | 180/443 |
| 7,781,926 | B2 * | 8/2010 | Schmidt | H02K 5/06 |
| | | | | 310/77 |
| 7,898,126 | B2 | 3/2011 | Kato | |
| 7,977,832 | B2 * | 7/2011 | Vadillo | H02K 9/14 |
| | | | | 310/58 |
| 8,931,528 | B2 * | 1/2015 | Hsiung | B27B 25/10 |
| | | | | 144/242.1 |
| 9,190,887 | B2 * | 11/2015 | Ito | H02K 9/14 |
| 9,812,920 | B2 * | 11/2017 | McKinzie | H02K 5/20 |
| 9,958,025 | B2 * | 5/2018 | Kuraishi | F16F 15/08 |
| 10,439,475 | B2 * | 10/2019 | Madsen Obel | H02K 5/18 |
| 2013/0076172 | A1 * | 3/2013 | Koyama | H02K 9/06 |
| | | | | 310/63 |
| 2015/0349604 | A1 | 12/2015 | Wallace | |
| 2016/0036298 | A1 | 2/2016 | Yamamoto | |

FOREIGN PATENT DOCUMENTS

| | | | | |
|---|---|---|---|---|
| CN | 104283373 | | 1/2015 | |
| CN | 204968290 | | 1/2016 | |
| CN | 106936252 | | 7/2017 | |
| CN | 206432856 | | 8/2017 | |
| EP | 1742334 A1 | * | 10/2007 | H02K 9/04 |
| JP | 2005-94949 | * | 4/2005 | H02K 9/02 |
| TW | M361825 | | 7/2009 | |
| TW | 201104077 | | 2/2011 | |
| TW | M401259 | | 4/2011 | |

* cited by examiner

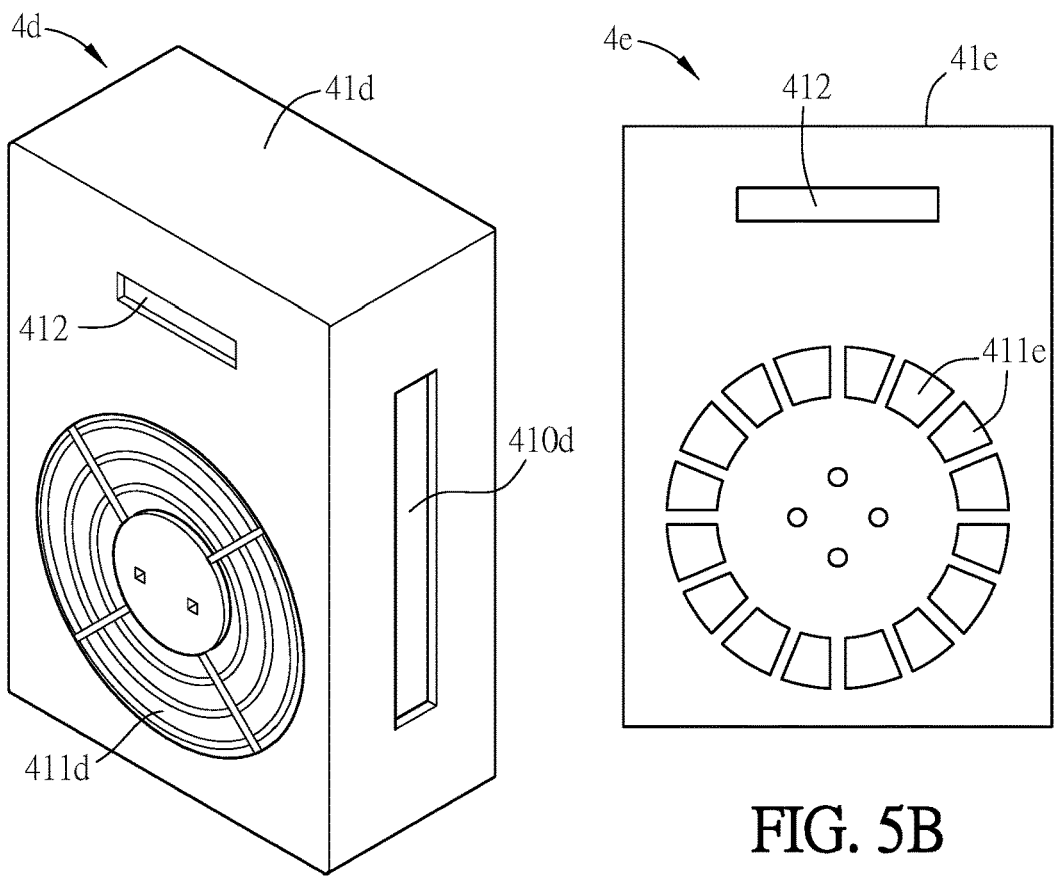
FIG. 5A
FIG. 5B
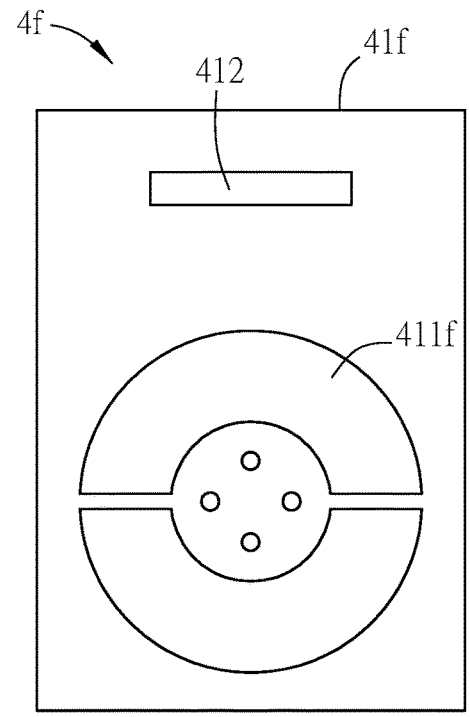
FIG. 5C

MOTOR DEVICE AND HEAT DISSIPATION DEVICE

CROSS REFERENCE TO RELATED APPLICATIONS

This Non-provisional application claims priority under 35 U.S.C. § 119(a) on Patent Application No(s). 107121566 filed in Taiwan, Republic of China on Jun. 22, 2018, the entire contents of which are hereby incorporated by reference.

BACKGROUND

Technology Field

This disclosure relates to a motor and a heat dissipation device and, in particular, to an integrated motor drive and a heat dissipation device thereof.

Description of Related Art

The integrated motor drive (IMD) device mainly includes a motor and a motor driver. The motor driver can drive the motor to rotate. In general, the motor driver is an inverter. Moreover, the motor driver further includes a controller for controlling the rotation speed of the motor.

For example, in the integrated motor drive device, the motor and the inverter are assembled and integrated together. This configuration has the advantages of saving power and space. Thus, the expansive connecting wires between the motor and the inverter can be reduced, and the external connection and layout can be also minimized. This integration design can decrease the required space for the integrated motor drive device, and the decreased layout can also make the circuit design much simpler.

In general, the inverter is fixed above the motor housing, and the heat generated by the inverter can be dissipated through the fins of the housing. However, in this integrated design, there is no damping device provided between the inverter and the housing, so that the vibration of the motor will be directly transmitted to the inverter. Accordingly, the electronic components of the inverter may be damaged by the vibration, and the lifetime and reliability of the electronic components may be decreased in the constant vibration environment. Besides, the heat of the operating motor may also be transferred to the inverter through the motor housing. Therefore, if the heat dissipation design of the inverter is not good enough, the lifetime and reliability of the electronic components of the inverter may also be decreased in the high-temperature environment.

Therefore, it is an important subject to provide an integrated motor drive and a heat dissipation device thereof that can prevent the transmitting of the vibration directly from the motor to the motor driver and can provide a proper heat dissipation function.

SUMMARY

In view of the foregoing, an objective of this disclosure is to provide a motor device and a heat dissipation device thereof that can prevent the transmitting of the vibration directly from the motor to the motor driver and can provide a proper heat dissipation function.

A motor device comprises a motor, a motor driver housing, a motor control circuit board, a heat dissipation device, a heat isolation element, and at least a fixing element. The motor comprises a plurality of fins separately arranged at a lateral portion of the motor. The motor driver housing comprises a bottom surface facing the lateral portion of the motor. A gap is provided between the bottom surface and the lateral portion of the motor, and the motor driver housing does not contact the motor. The motor control circuit board is disposed in the motor driver housing and adjacent to the bottom surface. The heat dissipation device is disposed at an end portion of the motor and connected to the motor driver housing. The heat dissipation device comprises a heat dissipation housing and a single fan. The heat dissipation housing comprises an inlet and a first outlet communicating, with each other, and the first outlet faces the gap between the bottom surface and the lateral portion of the motor. The single fan is disposed in the heat dissipation housing. Two ends of the heat isolation element are respectively connected to the motor and the heat dissipation housing. The fixing element passes through the heat isolation element and fixes the heat dissipation housing to the end portion of the motor.

In one embodiment, two adjacent fins and the lateral portion form a first channel, and a first airflow outputted from the first outlet flows through the first channel.

In one embodiment, the motor driver housing, comprises a plurality of heat dissipation plates disposed on the bottom surface, and a heat generated by the motor control circuit board is transferred to the heat dissipation plates.

In one embodiment, the heat dissipation plates are separately disposed, a second channel is formed between two of the heat dissipation plates, and a second airflow outputted from the first outlet flows through the second channel.

In one embodiment, a range of the first outlet covers the fins and a part of the heat dissipation plates.

In one embodiment, the heat dissipation housing comprises a second outlet, the motor driver housing comprises a second inlet communicating with the second outlet, and a third airflow outputted from the second outlet flows into the motor driver housing through the second inlet, passes through the motor control circuit board, and is outputted from a third outlet of the motor driver housing.

In one embodiment, the first outlet and the second outlet are disposed at the same side of the heat dissipation housing.

In one embodiment, the first outlet is an annular opening.

In one embodiment, the first outlet comprises a plurality of openings, and the openings are separately disposed in an annular shape and corresponding to the fins.

In one embodiment, the fixing element is an elastic screw.

In one embodiment, the heat isolation element does not block the first outlet.

In one embodiment, the heat dissipation housing further comprises a fourth outlet facing towards the end portion of the motor.

In one embodiment, an axis of the fan is not coaxial with a shaft of the motor.

In one embodiment, a diameter of the fan is less than an outer diameter of the motor, and the axis of the fan is located between the shaft of the motor and the motor driver housing.

In one embodiment, a diameter of the fan is greater than an outer diameter of the motor, and the diameter of the fan covers the outer diameter of the motor and a part of the motor driver housing.

A heat dissipation device, which is applied to a motor and a motor driver housing, comprises a heat dissipation housing, a single fan, a heat isolation element and at least a fixing element. The heat dissipation housing is disposed at an end portion of the motor and connected with the motor driver housing for fixing the motor driver housing so as to form a gap between the motor driver housing and the motor. The motor driver housing does not contact the motor. The heat dissipation housing comprises an inlet and a first outlet communicating with each other, and the first outlet faces the gap between the motor driver housing and the motor. The single fan is disposed in the heat dissipation housing. Two ends of the heat isolation element are respectively connected to the motor and the heat dissipation housing. The fixing element passes through the heat isolation element and fixes the heat dissipation housing to the end portion of the motor.

As mentioned above, in this disclosure, the heat dissipation housing is disposed at an end portion of the motor and connected with the motor driver housing for fixing the motor driver housing so as to form a gap between the motor driver housing and the motor. Thus, the motor driver housing does not contact the motor. Accordingly, the vibration of the motor cannot be directly transmitted to the motor driver so as to decrease the vibration of the electronic components of the motor driver. The heat generated by the operating motor is not transferred to the motor driver through the housing of the motor. This configuration can extend the lifetime of the components and improve the reliability of the motor driver.

BRIEF DESCRIPTION OF THE DRAWINGS

The disclosure will become more fully understood from the detailed description and accompanying drawings, which are given for illustration only, and thus are not limitative of the present disclosure, and wherein:

FIGS. 5A to 5C are schematic diagrams showing different heat dissipation devices;

DETAILED DESCRIPTION OF THE DISCLOSURE

The present disclosure will be apparent from the following detailed description, which proceeds with reference to the accompanying drawings, wherein the same references relate to the same elements.

Figure 1A:
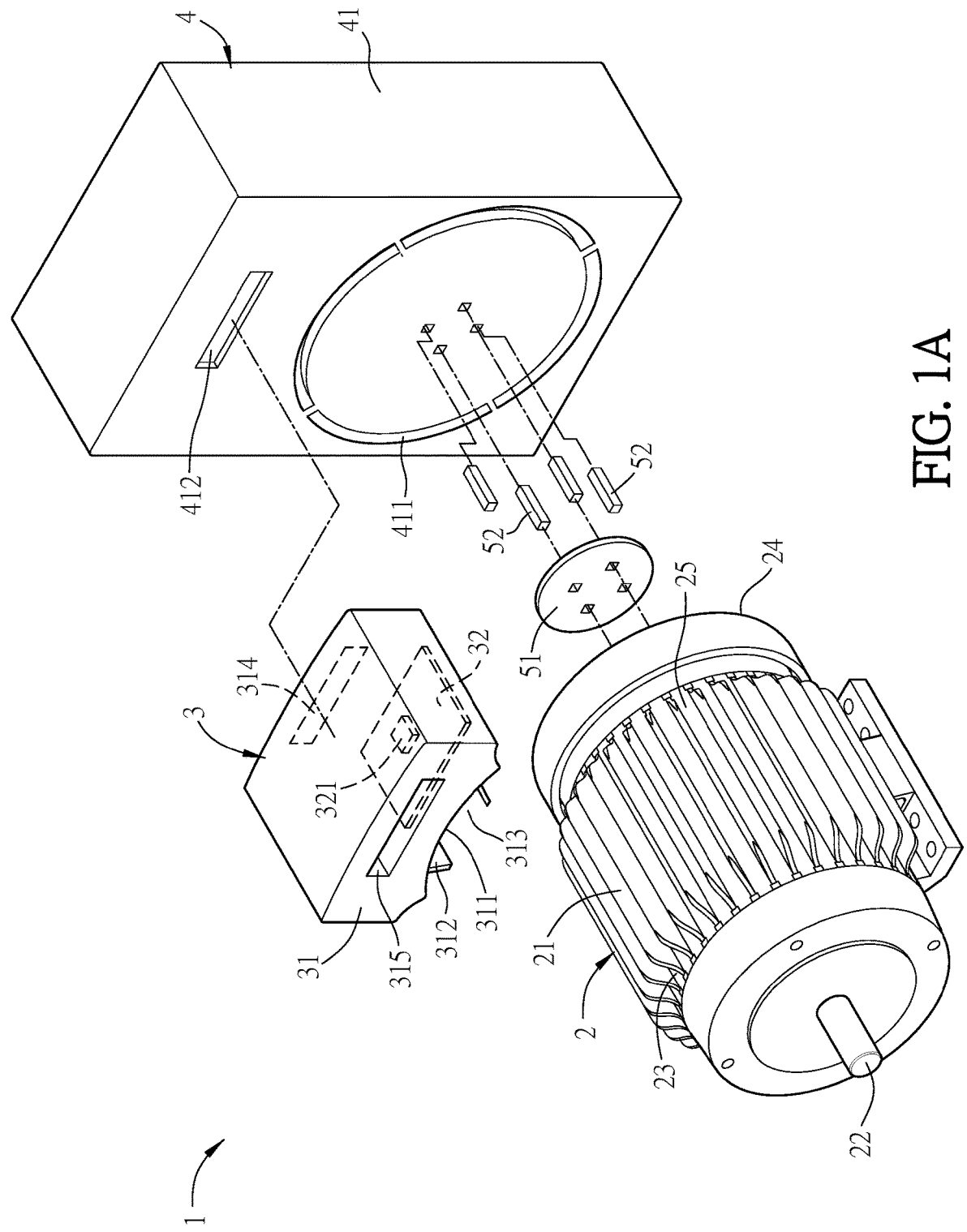
FIG. 1A is a schematic diagram showing a motor device according to an embodiment of this disclosure.
Figure 1B:
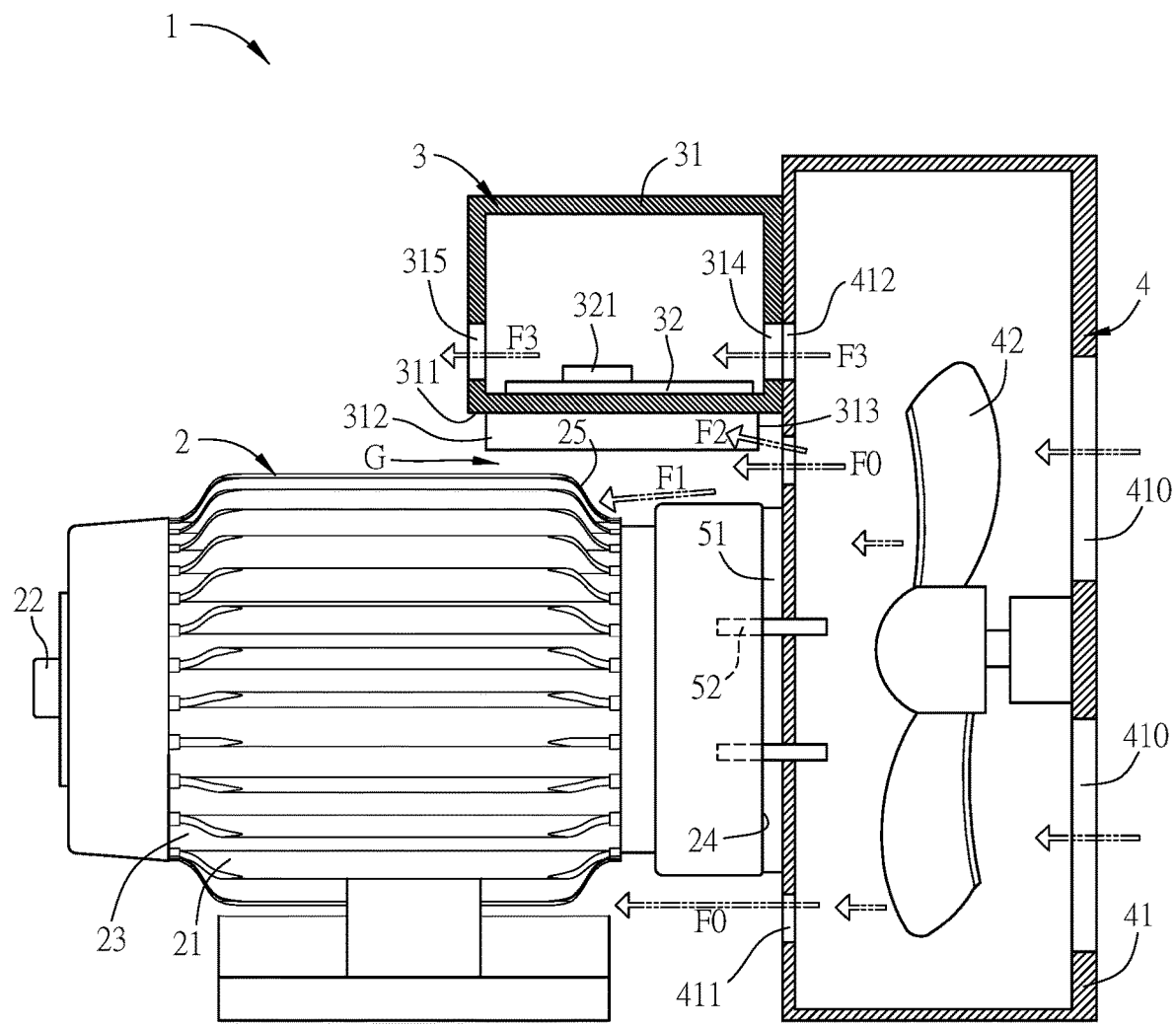
FIG. 1B is a front view of the motor device of FIG. 1A.
Figure 1C:
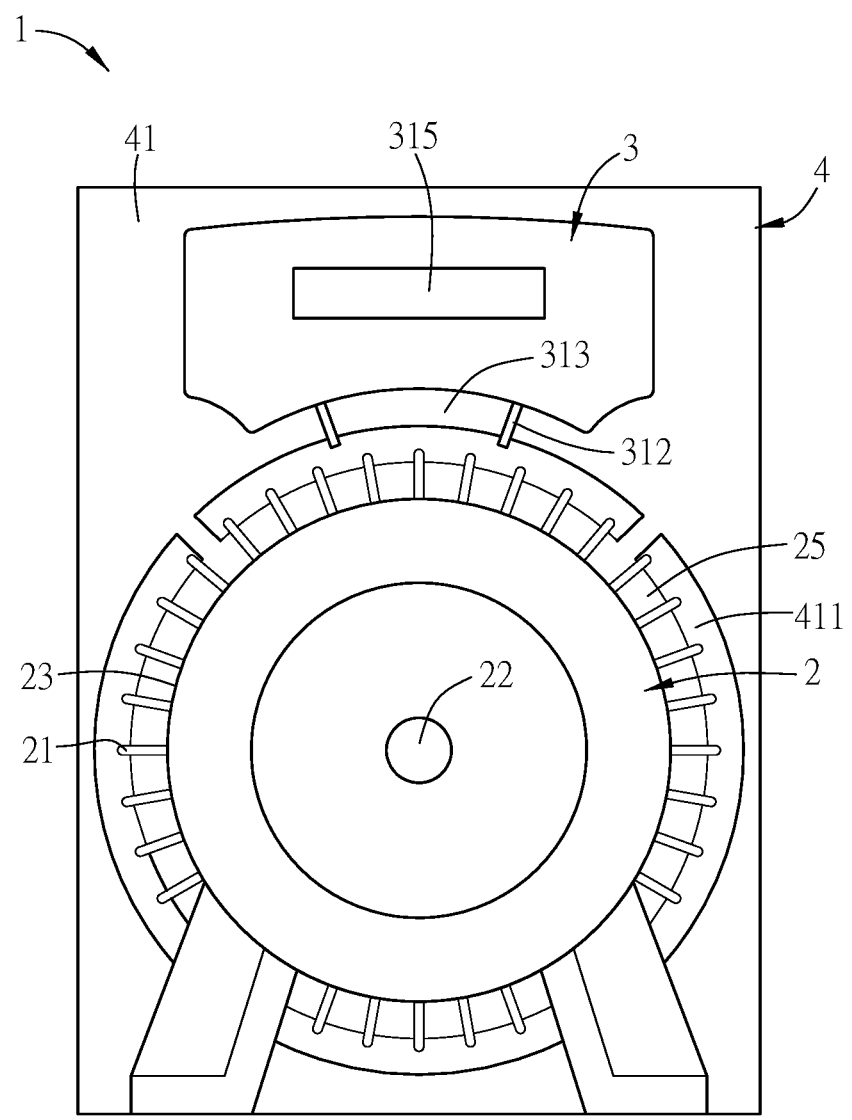
FIG. 1C is a side view of the motor device of FIG. 1A.

FIG. 1A is a schematic diagram showing a motor device according to an embodiment of this disclosure, FIG. 1B is a front view of the motor device of FIG. 1A, and FIG. 1C is a side view of the motor device of FIG. 1A. Referring to FIGS. 1A to 1C, a motor device 1 comprises a motor 2, a motor driver housing 31, a motor control circuit board 32, a heat dissipation device 4, a heat isolation element 51, and at least one fixing element 52.

The motor driver housing 31 and the motor control circuit board 32 can be integrated and named as a motor driver 3. The motor device 1 is an integrated motor drive (IMD), which utilizes the heat dissipation device 4 to integrate the motor 2 and the motor driver 3. The motor driver 3 can be designed based on the connected motor 2 for achieving the maximum performance of the motor 2 and sufficiently reducing the required wiring between the conventional motor, sensing devices, driver and control system.

The motor 2 comprises a plurality of separated fins 21. The fins 21 are disposed at a lateral portion 23 of the motor 2, and the lateral portion 23 is located on the outer housing of the motor 2. The motor 2 further comprises a shaft 22, which protrudes from one end of the outer housing and extends outwardly. The shaft 22 can connect to an object and drive the object to rotate. The internal components of the motor 2 are disposed inside the outer housing of the motor 2. The internal components include, for example, a rotor and a stator. The shaft 22 is installed on the rotor, and the rotor can drive the shaft 22 to rotate.

The motor driver housing 31 comprises a bottom surface 311, which faces the lateral portion 23 of the motor 2. A gap G is provided between the bottom surface 311 and the lateral portion 23, so that the motor driver housing 31 does not contact the motor 2. The motor control circuit board 32 is disposed inside the motor driver housing 31 and located adjacent to the bottom surface 311. The heat generated by the motor control circuit board 32 or other components can be dissipated through the bottom surface 311.

At least an electronic component 321 is disposed on a surface of the motor control circuit board 32. For example, the electronic component 321 can be a transistor (e.g. power transistor). The motor control circuit board 32 can control the rotation speed of the motor 2. For example, the motor control circuit board 32 includes a driver circuitry electrically connected with the motor 2 for driving the shaft 22 of the motor 2 to rotate. The driver circuitry can be, for example, an inverter, which comprises a plurality of power transistors. In addition, based on the circuit type of the motor 2, the driver circuitry can also be a convertor. The wires connecting the motor control circuit board 32 and the motor 2 can be disposed inside a heat dissipation housing 41 of the heat dissipation device 4. For example, a wire is disposed inside the heat dissipation housing 41, and two ends of the wire pass through two holes of the heat dissipation housing 41, respectively. One end of the wire passes through a hole of the motor driver housing 31 and connects to the motor control circuit board 32, and the other end of the wire passes through the outer housing of the motor 2 and connects to the electronic component (e.g. the stator) inside the motor 2.

In addition, the motor control circuit board 32 can further electrically connect to an external control system. The external control system can control the rotation speed of the motor 2 through the motor control circuit board 32. For example, the external control system may output a control signal to the motor control circuit board 32. Alternatively, the motor control circuit board 32 may include a controller, which can output a control signal to the driver circuitry. The control signal can control the current, voltage, or frequency outputted from the motor control circuit board 32 to the motor 2, thereby controlling the rotation speed of the motor 2. The control signal can be, for example, a PWM signal or a digital signal, which may carry an instruction.

The heat dissipation device 4 is disposed at an end portion 24 of the motor 2 and connected to the motor driver housing 31. The heat dissipation device 4 comprises a heat dissipation housing 41 and a single fan 42. The heat dissipation housing 41 has an inlet 410 and a first outlet 411, which are communicated with each other. The first outlet 411 faces a gap G between the bottom surface 311 and the lateral portion 23. The fan 42 is disposed inside the heat dissipation housing 41. When the fan 42 is operating, an airflow can enter the heat dissipation housing 41 through the inlet 410 and exit the heat dissipation housing 41 through the first outlet 411.

The first outlet 411 is disposed directly or obliquely towards the gap G, and the airflow outputted from the first outlet 411 can be directly blown or flowed to the gap G. Viewing from the first outlet 411 to the gap G, the opening of the first outlet 411 covers a part of the gap G In other embodiments, the opening of the first outlet 411 may cover the entire gap G or may not cover any of the gap G. The gap G is an air isolation layer for isolating the motor driver housing 31 and the motor 2. The airflow in the gap G can carry the heat generated by the motor driver 3 or the motor 2 away.

In addition, the first outlet 411 can be disposed directly or obliquely towards the fins 21, and the airflow outputted from the first outlet 411 can be directly blown or flowed to the fins 21. Adjacent two of the fins 21 and the lateral portion 23 form a first channel 25. A first airflow F1 is outputted from the first outlet 411 and flows through the first channel 25. The first airflow F1 can carry the heat generated by the motor 2 away, and the heat can be dissipated through the fins 21.

Since the heat generated by the motor control circuit board 32 is close to the bottom surface 311, the heat generated by the motor control circuit board 32 can also be dissipated via the motor driver housing 31 and the heat dissipation housing 41. For example, the motor driver housing 31 does not contact the motor 2 and is assembled with the heat dissipation housing 41. The heat generated by the motor control circuit board 32 can be transferred to the heat dissipation housing 41 through the motor driver housing 31. Then, the heat can be dissipated according to the heat exchange between the heat dissipation housing 41 and the external environment. To be noted, the heat is not transferred directly from the motor driver housing 31 to the motor 2.

Moreover, the motor driver housing 31 comprises a plurality of heat dissipation plates 312, which are disposed on the bottom surface 311. The heat generated by the motor control circuit board 32 can be transferred to the heat dissipation plates 312. Accordingly, the heat can also be dissipated via the heat dissipation plates 312 disposed under the bottom surface 311. The first outlet 411 can be disposed directly or obliquely towards the heat dissipation plates 312, and the airflow F0 outputted from the first outlet 411 can be directly blown or flowed to the heat dissipation plates 312. For example, the heat dissipation plates 312 are separately arranged, and a second channel 313 is formed between two of the heat dissipation plates 312. A second airflow F2 is outputted from the first outlet 411 and flows through the second channel 313. The second airflow F2 can carry the heat generated by the motor control circuit board 32 away, and the heat can be dissipated through the heat dissipation plates 312.

Two ends of the heat isolation element 51 are respectively connected to the motor 2 and the heat dissipation housing 41. The fixing element 52 passes through the heat isolation element 51 and fixes the heat dissipation housing 41 to the end portion 24 of the motor 2. The fixing element 52 is, for example, an elastic screw, or any of other types of fixing elements. The heat isolation element 51 can reduce the amount of the heat transferred to the heat dissipation housing 41, thereby blocking the heat exchange between the motor 2 and the heat dissipation housing 41. Since the motor driver 3 and the motor 2 are not directly contacted with each other, the heat isolation element 51 can also reduce the amount of the heat transferred between the motor 2 and the motor driver 3 through the heat dissipation housing 41. Accordingly, the heat generated by the motor control circuit board 32 can be mostly transferred to the heat dissipation housing 41, thereby prohibiting the heat to be transferred to the motor 2 and decreasing the heat to be transferred from the motor 2 to the motor driver 3.

Furthermore, the heat isolation element 51 can be used as a damping element between the heat dissipation housing 41 and the motor 2 for absorbing the vibration of the motor 2. This configuration can also prevent the vibration of motor 2 from transmitting to the motor driver 3, thereby protecting the electronic components of the motor driver 3 from the vibration.

In addition, the heat dissipation housing 41 comprises a second outlet 412. When the fan 42 is operating, the airflow can enter through the inlet 410 and exit through the second outlet 412. The motor driver housing 31 comprises a second inlet 314 communicating with the second outlet 412. A third airflow F3 outputted from the second outlet 412 flows into the motor driver housing 31 through the second inlet 314, passes through the motor control circuit board 32, and is outputted from a third outlet 315 of the motor driver housing 31. The third airflow F3 can carry the heat, which is generated by the motor control circuit board 32 and the electronic components 321 thereof and is dissipated inside the motor driver housing 31, away.

The first outlet 411 and the second outlet 412 are disposed at the same side of the heat dissipation housing 41, which is the air output side of the fan. When the fan 42 is operating, the airflow enters through the inlet 410, flows from the air input side of the fan 42 to the air output side of the fan 42, and is outputted through the first outlet 411 and the second outlet 412 at the air output side of the fan 42.

The first outlet 411 can be an annular opening, and the range of the first outlet 411 covers a part of the fins 21 and a part of the heat dissipation plates 312. The heat isolation element 51 does not cover the first outlet 411. A diameter of the fan 42 is greater than an outer diameter of the motor 2, and the diameter of the fan 42 covers the outer diameter of the motor 2 and a part of the motor driver housing 31. When the motor driver housing 31 is disposed above the motor 2, the axis of the fan 42 is located between the shaft 22 of the motor 2 and the motor driver housing 31 (along the vertical direction).

The heat dissipation device 4 is configured with only a single fan 42, and the fan 42 is used to blow towards the motor 2 and the motor driver 3. The heat dissipation device 4 can integrate the motor 2 and the motor driver 3, and the fan 42 of the heat dissipation device 4 can simply dissipate the heat of the motor 2 and the motor driver 3.

Figure 2A:
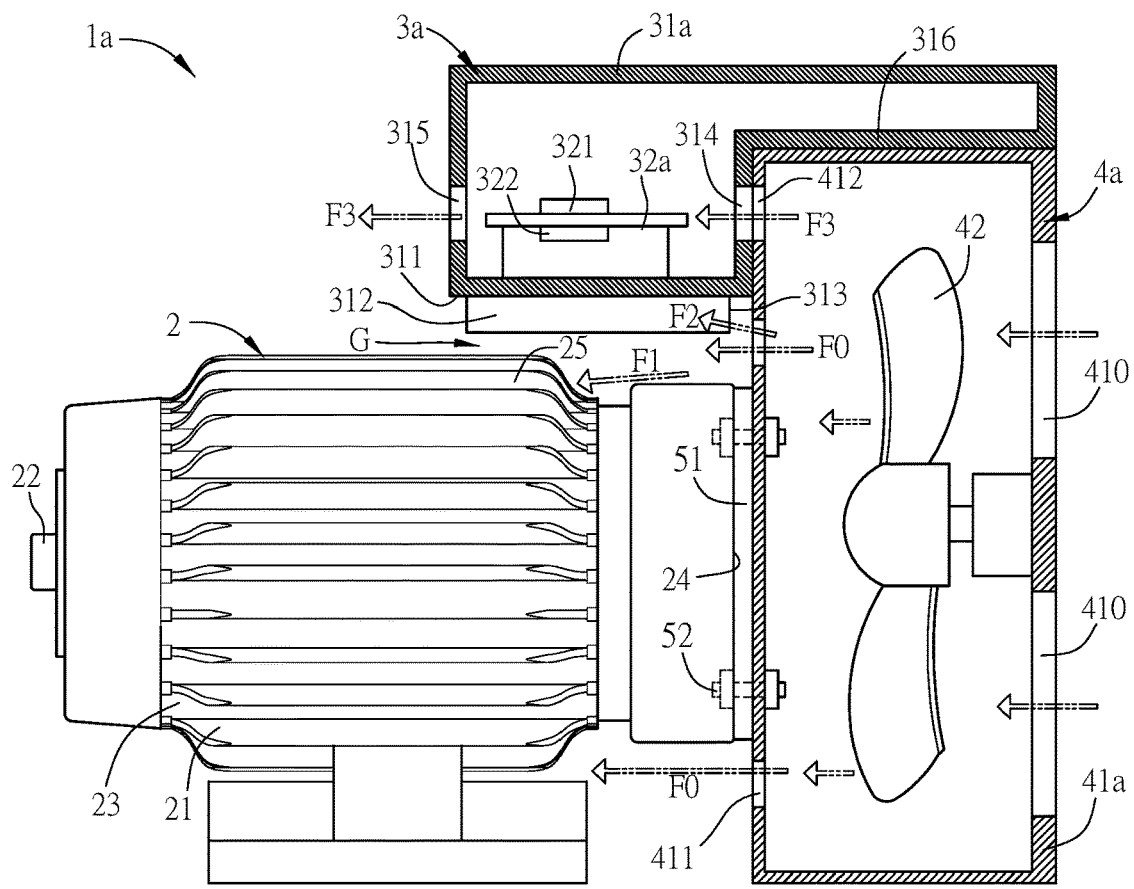
FIG. 2A is a front view of another motor device.
Figure 2B:
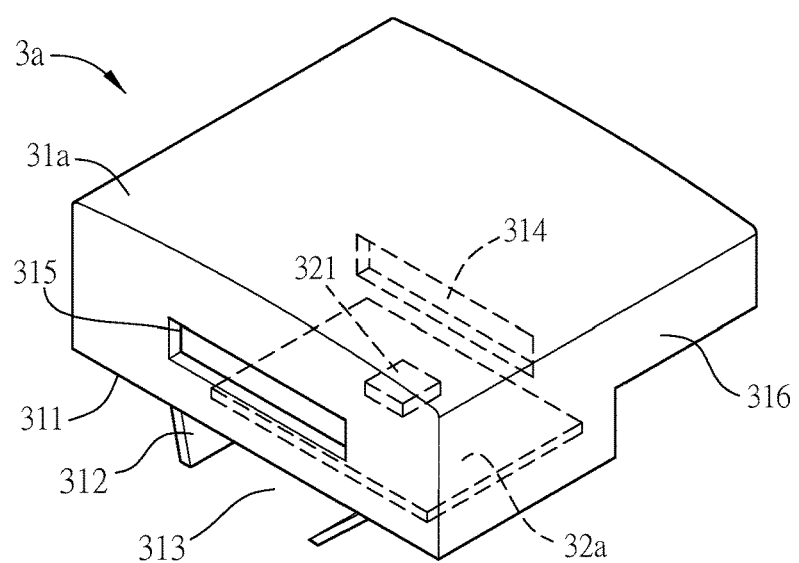
FIG. 2B is a schematic diagram of the motor driver housing of FIG. 2A.

FIG. 2A is a front view of another motor device, and FIG. 2B is a schematic diagram of the motor driver housing of FIG. 2A. The components of FIGS. 2A and 2B the same as, similar to and corresponding to those shown in FIGS. 1A and 1B will be referred to the same reference numbers. Referring to FIGS. 2A and 2B, in the motor device 1a, the motor driver housing 31a comprises an extension portion 316 installed on the heat dissipation housing 41a for fixing the motor driver housing 31a on the heat dissipation housing 41a. For example, the extension portion 316 has an L shape. The part of the motor driver housing 31a around the second inlet 314 does not have to be fixed to the part of the heat dissipation housing 41a around the second outlet 412. In other embodiments, the extension portion 316 of the motor driver housing 31a and the part of the motor driver housing 31a around the second inlet 314 can be fixed to the heat dissipation housing 41a.

In addition, the electronic components 321 and 322 are disposed at two sides of the motor control circuit board 32a. The electronic components 321 and 322 can be, for example, transistors (e.g. power transistors). The third airflow F3 can carry the heat, which is generated by the motor control circuit board 32a and the electronic components 321 and 322 thereof and is dissipated inside the motor driver housing 31a, away.

Figure 3A:
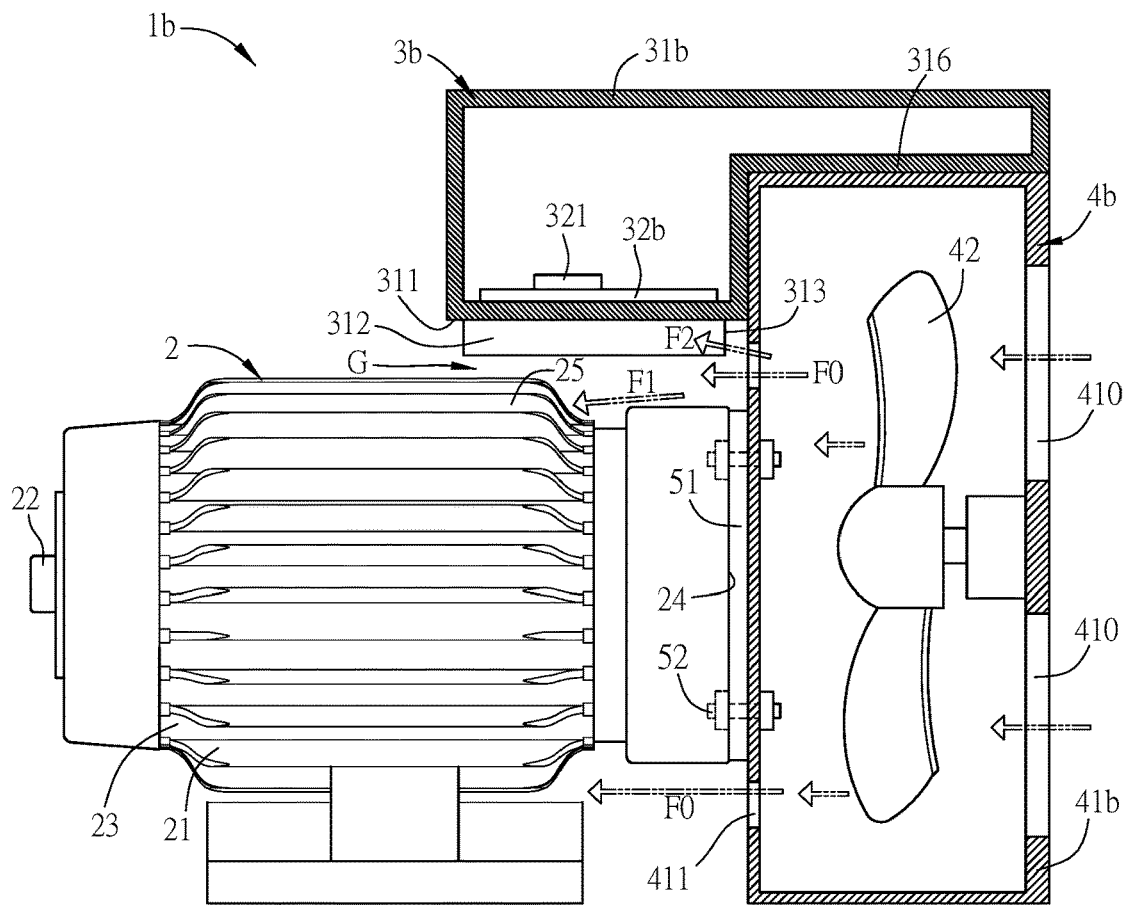
FIG. 3A is a front view of another motor device.
Figure 3B:
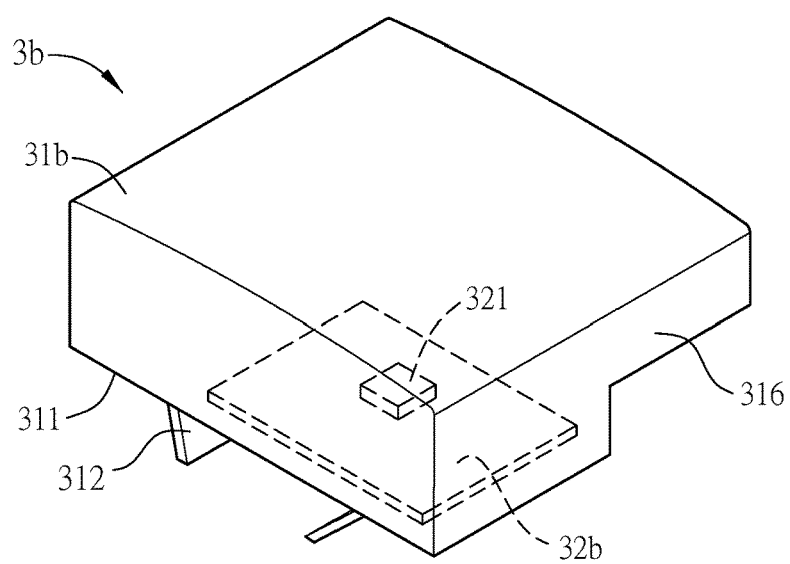
FIG. 3B is a schematic diagram of the motor driver housing of FIG. 3A.

FIG. 3A is a front view of another motor device, and FIG. 3B is a schematic diagram of the motor driver housing of FIG. 3A. The components of FIGS. 3A and 3B the same as, similar to and corresponding to those shown in other figures will be referred to the same reference numbers. Referring to FIGS. 3A and 3B, in the motor device 1b, the motor driver housing 31b is not configured with the second inlet, and the heat dissipation housing 41b is not configured with the second outlet.

Figure 4:
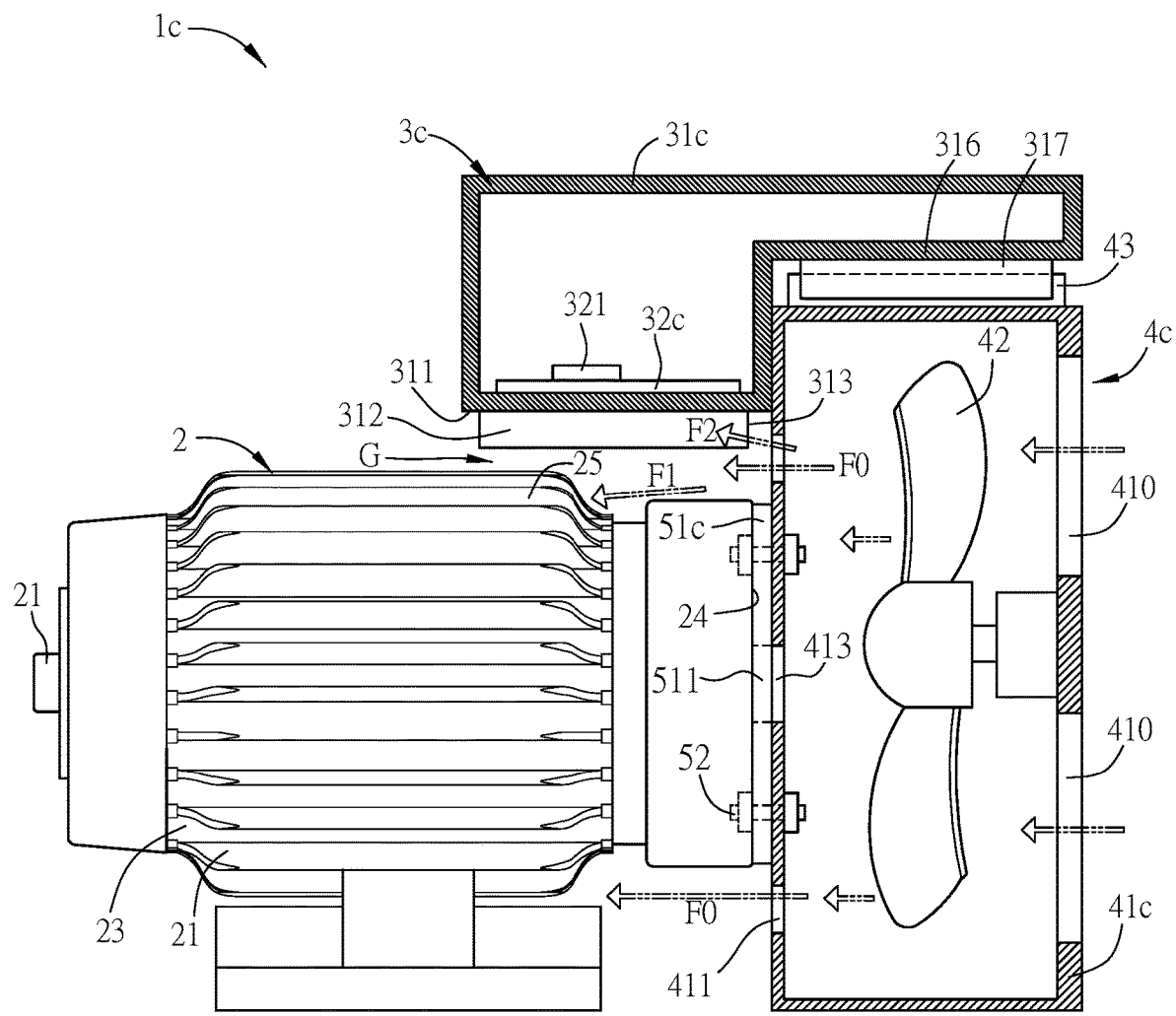
FIG. 4 is a front view of another motor device.

FIG. 4 is a front view of another motor device. The components of FIG. 4 the same as, similar to and corresponding to those shown in other figures will be referred to the same reference numbers. Referring to FIG. 4, in the motor device 1c, the motor driver housing 31c comprises an installation portion 317 configured on the extension portion 316, and the heat dissipation device 4c comprises fins 43 disposed on the top of the heat dissipation housing 412c. The motor driver housing 31c is fixed on the fins 43 via the installation portion 317. The installation portion 317 can be fixed on the fins 43 by locking or engaging. The heat generated by the motor driver 3c can be dissipated through the fins 43.

In addition, the heat dissipation housing 41c may further comprise a fourth outlet 413 facing the end portion 24 of the motor 2. The heat isolation element 51c has a through hole 511 aligned to the fourth outlet 413. Accordingly, the airflow outputted from the fourth outlet 413 can flow to the motor 2 for dissipating the heat of the motor 2. Moreover, the motor 2 has a through hole disposed at the end portion 24, so that the airflow inputted through the fourth outlet can flow out via the through hole, thereby assisting the heat dissipation of the inside of the motor 2.

FIGS. 5A to 5C are schematic diagrams showing different heat dissipation devices. The components of FIGS. 5A to 5C the same as, similar to and corresponding to those shown in other figures will be referred to the same reference numbers.

In the heat dissipation device 4d of FIG. 5A, the inlet 410d is disposed at the lateral side of the heat dissipation housing 41d, a side of the heat dissipation housing 41d opposite to the first outlet 411d is not configured with any inlet. In addition, the first outlet 411d can be an opening configured with a covering net. The center of the covering net is provided for installing the motor 2 and the fixing element 52. The holes of the covering net are used as the first outlet 411d. When the end portion 24 of the motor 2 is greater than the center of the covering net, the first outlet 411d will face to the gap G as well as the end portion 24 of the motor 2. The range of the first outlet 411d may cover the entire fins 21.

In the heat dissipation device 4e of FIG. 5B (side view), the first outlet 411e comprises a plurality of openings, which are separately disposed in an annular shape and corresponding to the fins 21 of the motor 2. For example, the number of the openings of the first outlet 411e is equal to the number of the fins 21. Thus, each opening is aligned to an interval between two fins 21, and the partitions between the openings are disposed opposite to the fins 21 one by one. This configuration can concentrate the airflow outputted from the first outlet 411e to the motor 2. For example, the airflow outputted from the first outlet 411e can be concentrated and flow to the first channel 25 or the lateral portion 23. The airflow outputted from one opening can flow to one corresponding first channel 25.

In the heat dissipation device 4f of FIG. 5C (side view), the first outlet 411f comprises a plurality of openings, which are aligned to the intervals between the fins 21, respectively, as well as the end portion 24 of the motor 2. In addition, one opening can cover the intervals between multiple fins 21, and the airflow outputted from one opening can flow to multiple first channels 25.

Figure 6A:
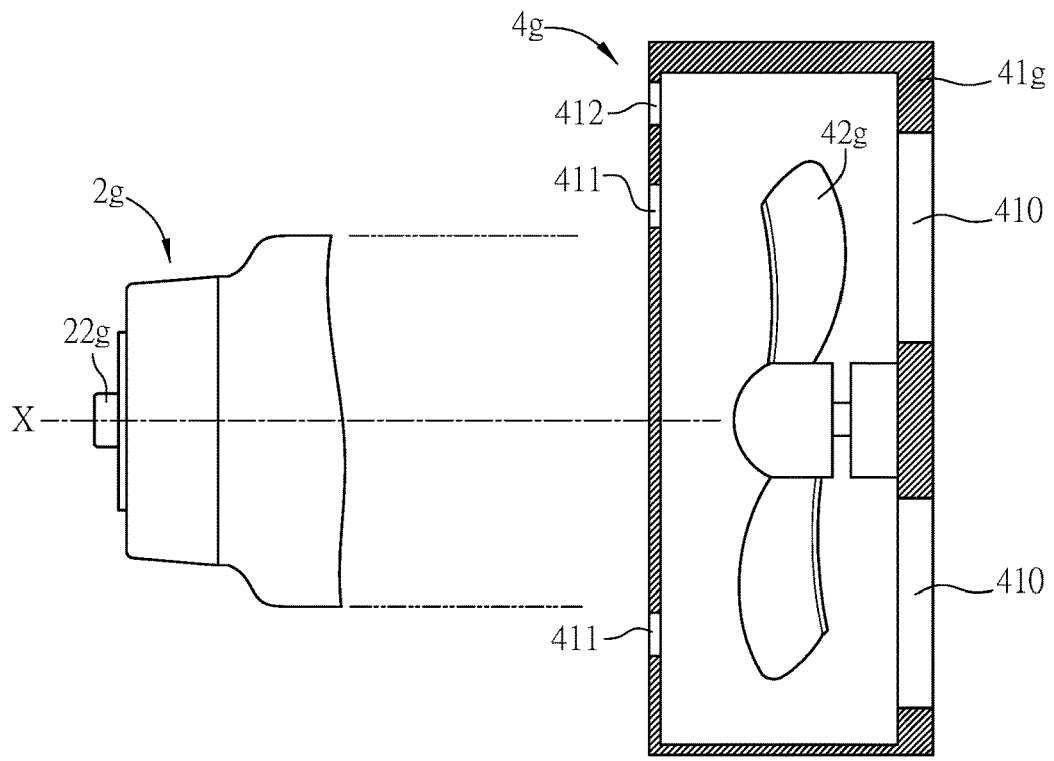
FIGS. 6A to 6C are front views of different aspects of the heat dissipation device and the motor.
Figure 6B:
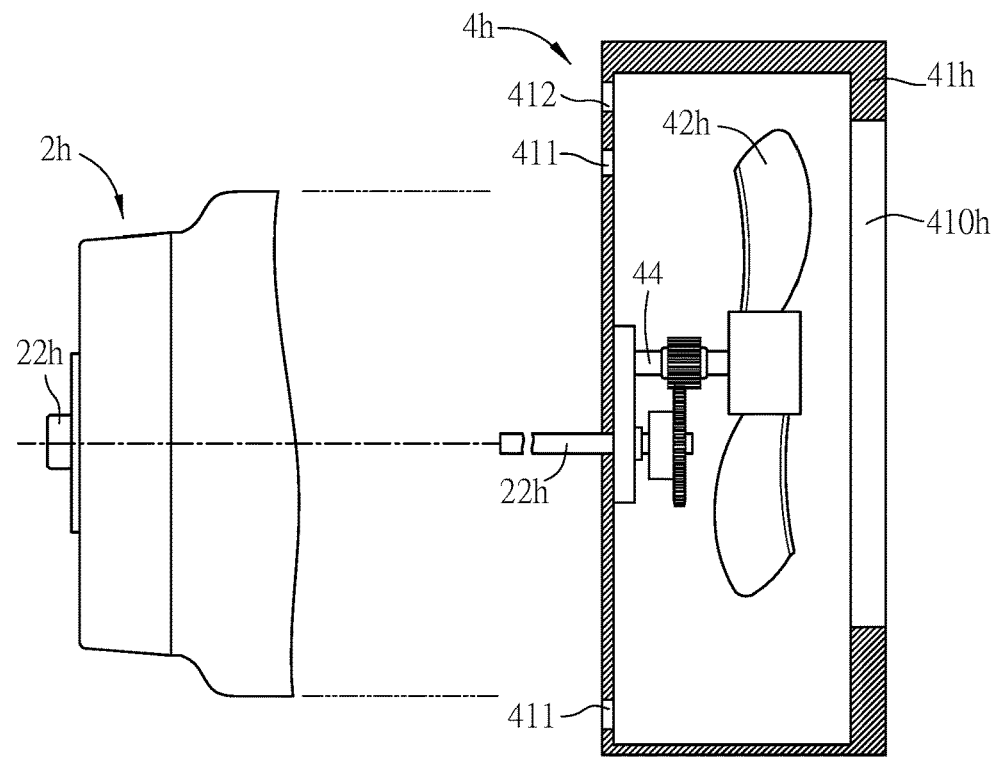
Figure 6C:
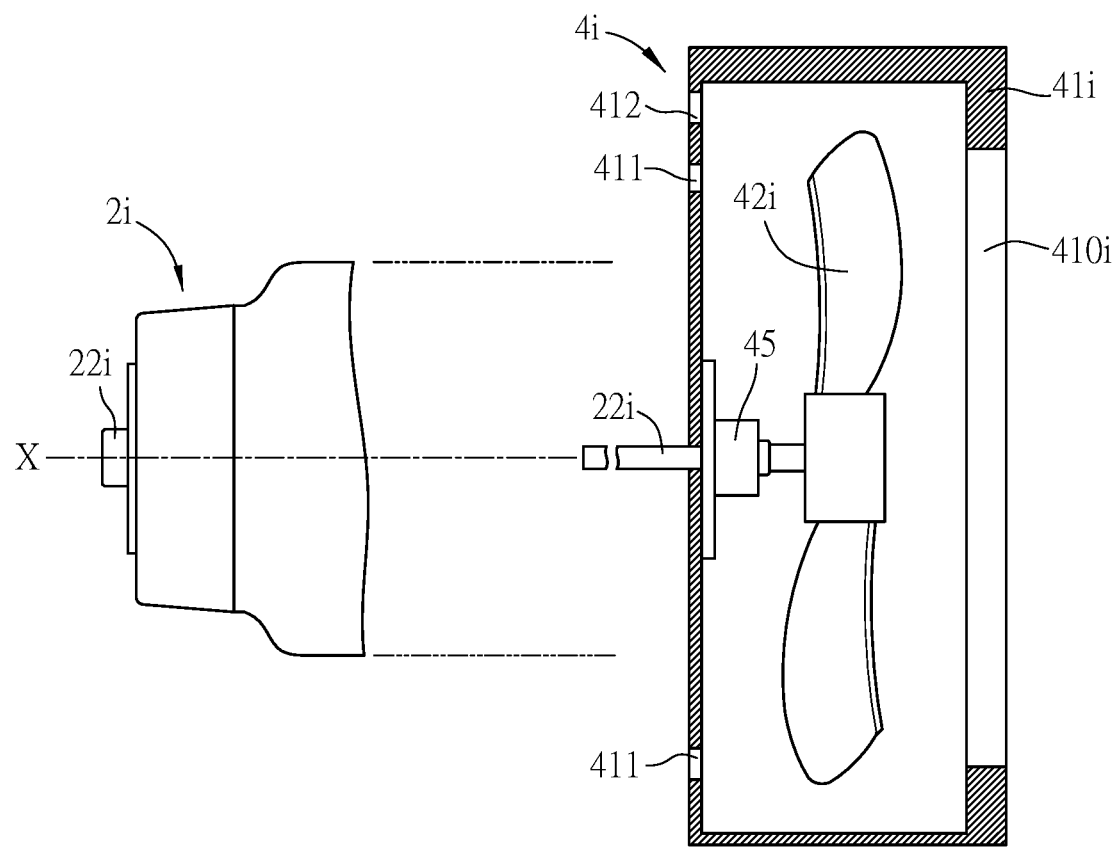

FIGS. 6A to 6C are front views of different aspects of the heat dissipation device and the motor. The components of FIGS. 5A to 5C the same as, similar to and corresponding to those shown in other figures will be referred to the same reference numbers. To be noted, some components (e.g. the heat isolation element and the fixing element) are not shown in FIGS. 6A to 6B.

In the heat dissipation device 4g of FIG. 6A, the axis of the fan 42g lies along the X-axis, and the shaft 22g of the motor 2g also lies along the X-axis. The axis of the fan 42g is aligned to the shaft 22g of the motor 2g, and they are not connected to each other. Thus, the shaft 22g of the motor 2g cannot drive the fan 42g to rotate, and the shaft 22g of the motor 2g and the fan 42g rotate individually.

In the heat dissipation device 4h of FIG. 6B, the axis of the fan 42h and the shaft 22h of the motor 2h are not coaxial, and the shaft 22h drives the fan 42h to rotate through a gearing element 44 (e.g. gearwheel(s)). A diameter of the fan 42h is less than an outer diameter of the motor 2h. When the motor driver housing 31 is disposed above the motor 2h, the axis of the fan 42h is located between the shaft 22h of the motor 2h and the motor driver housing 31 (along the vertical direction). In addition, since there is no bearing disposed for the axis of the fan 42h, the inlet 410h can be designed larger.

In the heat dissipation device 4i of FIG. 6C, the axis of the fan 42i lies along the X-axis, and the shaft 22i of the motor 2i also lies along the X-axis. The axis of the fan 42i and the shaft 22i of the motor 2i are coaxial, and the shaft 22i of the motor 2i can drive the fan 42i to rotate through a coupling 45.

Figure 7:
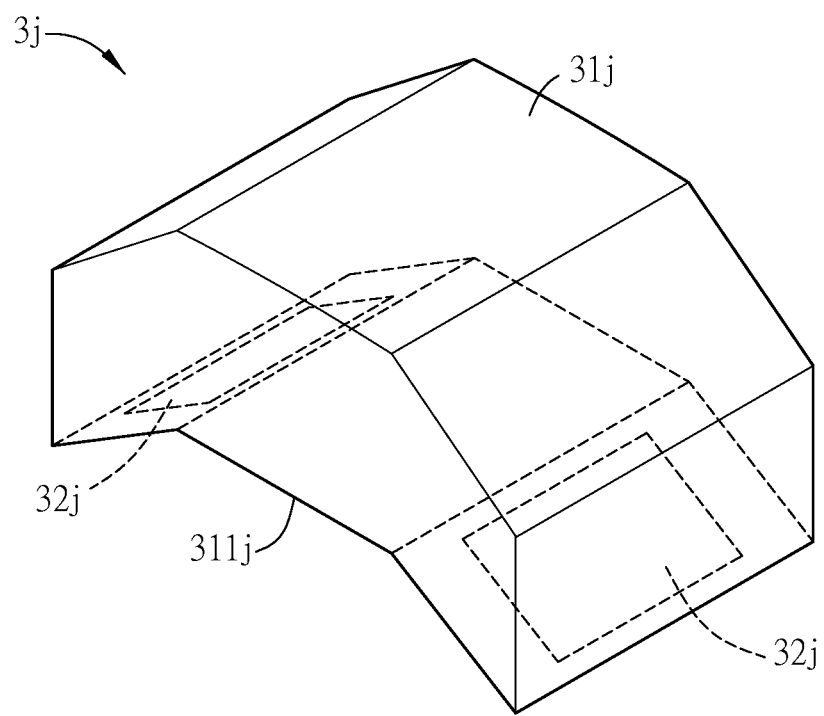
FIG. 7 is a schematic diagram showing another motor driver housing.

FIG. 7 is a schematic diagram showing another motor driver housing. The components of FIG. 7 the same as, similar to and corresponding to those shown in other figures will be referred to the same reference numbers. In the motor driver 3j, the bottom surface 311j of the motor driver housing 31j may have one or more bending portions for fitting the shape of the motor 2. In addition, the motor driver 3j may have a plurality of motor control circuit boards 32j, which can be disposed at different places inside the motor driver housing 31j for fitting the shape of the motor 2.

To sum up, in this disclosure, the heat dissipation housing is disposed at an end portion of the motor and connected with the motor driver housing for fixing the motor driver housing so as to form a gap between the motor driver housing and the motor. Thus, the motor driver housing does not contact the motor. Accordingly, the vibration of the motor cannot be directly transmitted to the motor driver so as to decrease the vibration of the electronic components of the motor driver. The heat generated by the operating motor is not transferred to the motor driver through the housing of the motor. This configuration can extend the lifetime of the components and improve the reliability of the motor driver.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A motor device, comprising:
   a motor comprising a plurality of fins separately arranged at a lateral portion of the motor;
   a motor driver housing comprising a bottom surface facing the lateral portion of the motor, wherein a gap is provided between the bottom surface and the lateral portion of the motor, and all parts of the motor driver housing do not contact the motor and are not installed at the motor;
   a motor control circuit board disposed in the motor driver housing and adjacent to the bottom surface;
   a heat dissipation device disposed at an end portion of the motor and connected to the motor driver housing, wherein the heat dissipation device comprises:
      a heat dissipation housing comprising an inlet and a first outlet communicating with each other, wherein the first outlet faces the gap between the bottom surface and the lateral portion of the motor, and
      a single fan disposed in the heat dissipation housing;
   a heat isolation element, wherein two ends of the heat isolation element are respectively connected to the motor and the heat dissipation housing; and
   at least a fixing element passing through the heat isolation element and fixing the heat dissipation housing to the end portion of the motor.

2. The motor device according to claim 1, wherein adjacent two of the fins and the lateral portion form a first channel, and a first airflow outputted from the first outlet flows through the first channel.

3. The motor device according to claim 1, wherein the motor driver housing comprises:
   a plurality of heat dissipation plates disposed on the bottom surface, and a heat generated by the motor control circuit board is transferred to the heat dissipation plates.

4. The motor device according to claim 3, wherein the heat dissipation plates are separately disposed, a second channel is formed between two of the heat dissipation plates, and a second airflow outputted from the first outlet flows through the second channel.

5. The motor device according to claim 3, wherein a range of the first outlet covers the fins and a part of the heat dissipation plates.

6. The motor device according to claim 1, wherein the heat dissipation housing comprises a second outlet, the motor driver housing comprises a second inlet communicating with the second outlet, and a third airflow outputted from the second outlet flows into the motor driver housing through the second inlet, passes through the motor control circuit board, and is outputted from a third outlet of the motor driver housing.

7. The motor device according to claim 6, wherein the first outlet and the second outlet are disposed at the same side of the heat dissipation housing.

8. The motor device according to claim 1, wherein the first outlet comprises at least one arc-shaped opening.

9. The motor device according to claim 1, wherein the first outlet comprises a plurality of openings, and the openings are separately disposed in an annular shape and corresponding to the fins.

10. The motor device according to claim 1, wherein the fixing element is an elastic screw.

11. The motor device according to claim 1, wherein the heat isolation element does not block the first outlet.

12. The motor device according to claim 1, wherein the heat dissipation housing further comprises:
   an additional outlet facing towards the end portion of the motor.

13. The motor device according to claim 1, wherein an axis of the fan is not coaxial with a shaft of the motor.

14. The motor device according to claim 13, wherein a diameter of the fan is less than an outer diameter of the motor, and the axis of the fan is located between the shaft of the motor and the motor driver housing.

15. The motor device according to claim 1, wherein a diameter of the fan is greater than an outer diameter of the motor, and the diameter of the fan covers the outer diameter of the motor and a part of the motor driver housing.

16. A heat dissipation device applied to a motor and a motor driver housing, the heat dissipation device comprising:
   a heat dissipation housing disposed at an end portion of the motor and connected with the motor driver housing for fixing the motor driver housing so as to form a gap between the motor driver housing and the motor, wherein the motor driver housing does not contact the motor, the heat dissipation housing comprises an inlet and a first outlet communicating with each other, and the first outlet faces the gap between the motor driver housing and the motor;
   a single fan disposed in the heat dissipation housing;
   a heat isolation element, wherein two ends of the heat isolation element are respectively connected to the motor and the heat dissipation housing; and
   at least a fixing element passing through the heat isolation element and fixing the heat dissipation housing to the end portion of the motor;
   wherein an axis of the fan is not coaxial with a shaft of the motor.

17. A heat dissipation device applied to a motor and a motor driver housing, the heat dissipation device comprising:
   a heat dissipation housing disposed at an end portion of the motor and connected with the motor driver housing for fixing the motor driver housing so as to form a gap between the motor driver housing and the motor, wherein the motor driver housing does not contact the motor, the heat dissipation housing comprises an inlet and a first outlet communicating with each other, and the first outlet faces the gap between the motor driver housing and the motor;
   a single fan disposed in the heat dissipation housing;
   a heat isolation element, wherein two ends of the heat isolation element are respectively connected to the motor and the heat dissipation housing; and
   at least a fixing element passing through the heat isolation element and fixing the heat dissipation housing to the end portion of the motor;
   wherein a diameter of the fan is greater than an outer diameter of the motor, and the diameter of the fan covers the outer diameter of the motor and a part of the motor driver housing.

* * * * *